US009782902B1

(12) United States Patent
Kim et al.

(10) Patent No.: US 9,782,902 B1
(45) Date of Patent: Oct. 10, 2017

(54) GRIPPER FOR ROBOT HAND CAPABEL OF ADAPTIVE GRASP

(71) Applicant: ROBOTIS CO., LTD., Seoul (KR)

(72) Inventors: Byoung Soo Kim, Seoul (KR); Jung Ho Lee, Gwangmyeong-si (KR)

(73) Assignee: ROBOTIS CO., LTD., Seoul (KR)

( * ) Notice: Subject to any disclaimer, the term of this patent is extended or adjusted under 35 U.S.C. 154(b) by 0 days.

(21) Appl. No.: 15/197,705

(22) Filed: Jun. 29, 2016

(30) Foreign Application Priority Data

Jun. 29, 2016 (KR) ........................ 10-2016-0081884

(51) Int. Cl.
*B25J 15/12* (2006.01)
*B25J 9/16* (2006.01)
*B25J 15/02* (2006.01)

(52) U.S. Cl.
CPC ............. *B25J 15/12* (2013.01); *B25J 9/1612* (2013.01); *B25J 15/022* (2013.01); *Y10S 901/39* (2013.01)

(58) Field of Classification Search
CPC  B25J 15/0009; B25J 15/0028; B25J 15/0206; B25J 15/0213; B25J 15/022; B25J 15/08; B25J 15/12; B25J 9/1612; A61F 2/586; Y10S 901/38; Y10S 901/39
USPC ........................................................ 294/106
See application file for complete search history.

(56) References Cited

U.S. PATENT DOCUMENTS

| | | | | |
|---|---|---|---|---|
| 3,927,424 A | * | 12/1975 | Itoh ........................ | B25J 15/022 294/106 |
| 4,368,913 A | * | 1/1983 | Brockmann et al. .................... | B25J 15/0266 294/106 |
| 6,260,902 B1 | * | 7/2001 | Synnelius ............ | B25J 15/0206 294/106 |
| 7,293,812 B2 | * | 11/2007 | Kushnir .................. | B25B 5/064 294/106 |
| 8,388,035 B2 | * | 3/2013 | Kamon et al. ....... | B25J 15/0266 294/106 |
| 8,474,893 B2 | * | 7/2013 | Kawanami et al. . | B25J 15/0213 294/106 |
| 8,720,964 B2 | * | 5/2014 | Birglen ................ | B25J 15/0009 294/106 |
| 8,757,690 B2 | * | 6/2014 | Gao et al. ................ | B25J 15/08 294/106 |
| 8,973,958 B2 | * | 3/2015 | Allen Demers et al. .................... | B25J 15/0009 294/106 |
| 2011/0148132 A1 | * | 6/2011 | Park et al. ............... | B25J 15/10 294/106 |

FOREIGN PATENT DOCUMENTS

| | | | |
|---|---|---|---|
| KR | 10-2012-0033611 A | | 4/2012 |
| KR | 10-2015-0089657 A | | 8/2015 |
| WO | WO 2016/037288 | * | 3/2016 |

* cited by examiner

*Primary Examiner* — Dean Kramer
(74) *Attorney, Agent, or Firm* — Revolution IP, PLLC

(57) ABSTRACT

Disclosed is a gripper for robot hand capable of adaptive grasp, including a finger unit having one or more finger which includes a first link of which one end is rotatably fixed to a casing; a second link of which one end is jointly coupled with the other end of the first link; a third link of which one end is rotatably fixed to the casing, which is operated by receiving a driving force from the outside; a fourth link of which one end is jointly coupled with the other end of the third link; and a gripping member jointly coupled with the other end of the second link and the other end of the fourth link.

8 Claims, 12 Drawing Sheets

[FIG. 1]
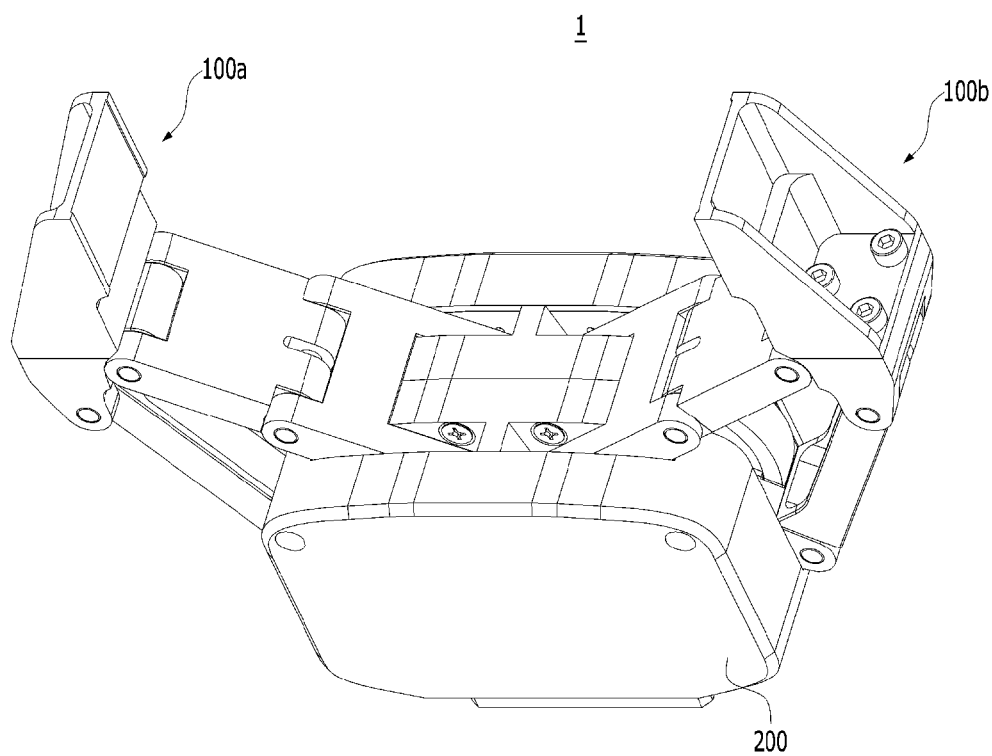

[FIG. 2]
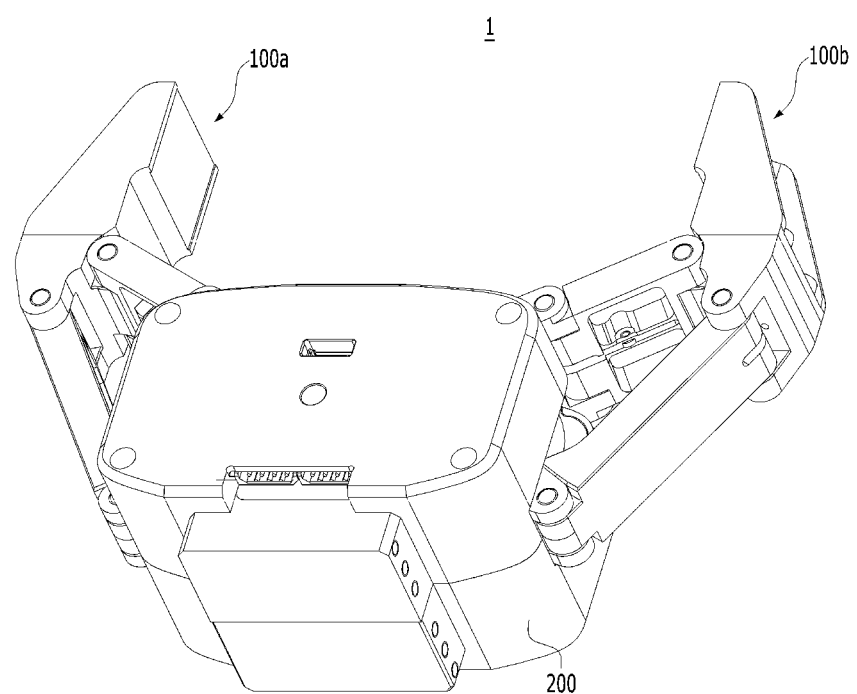

[FIG. 3]
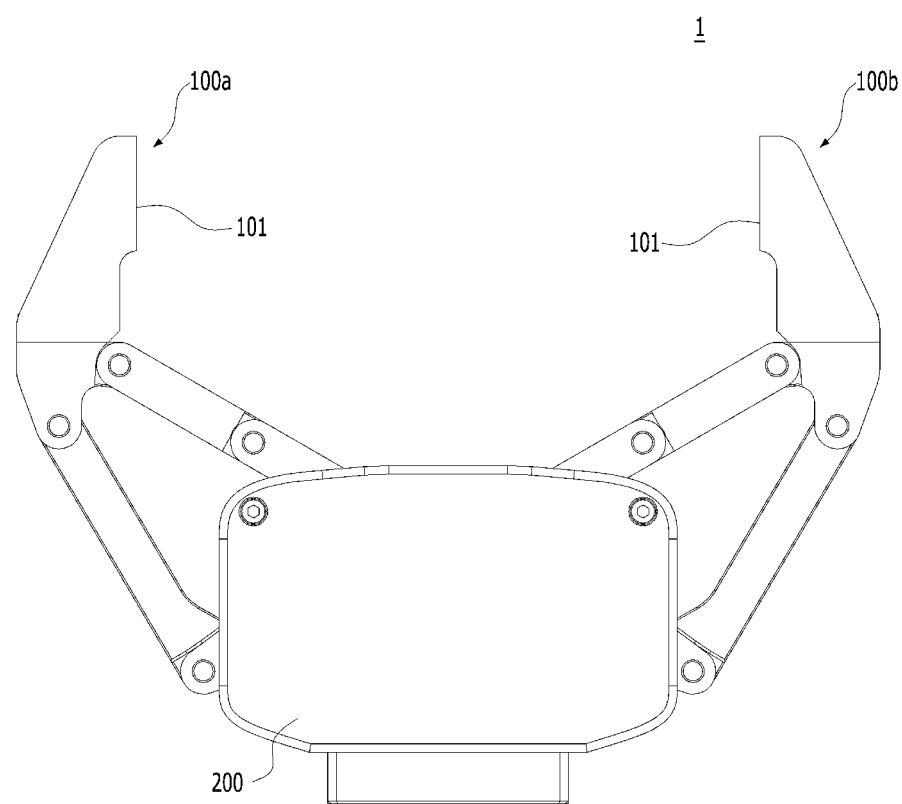

[FIG. 4]
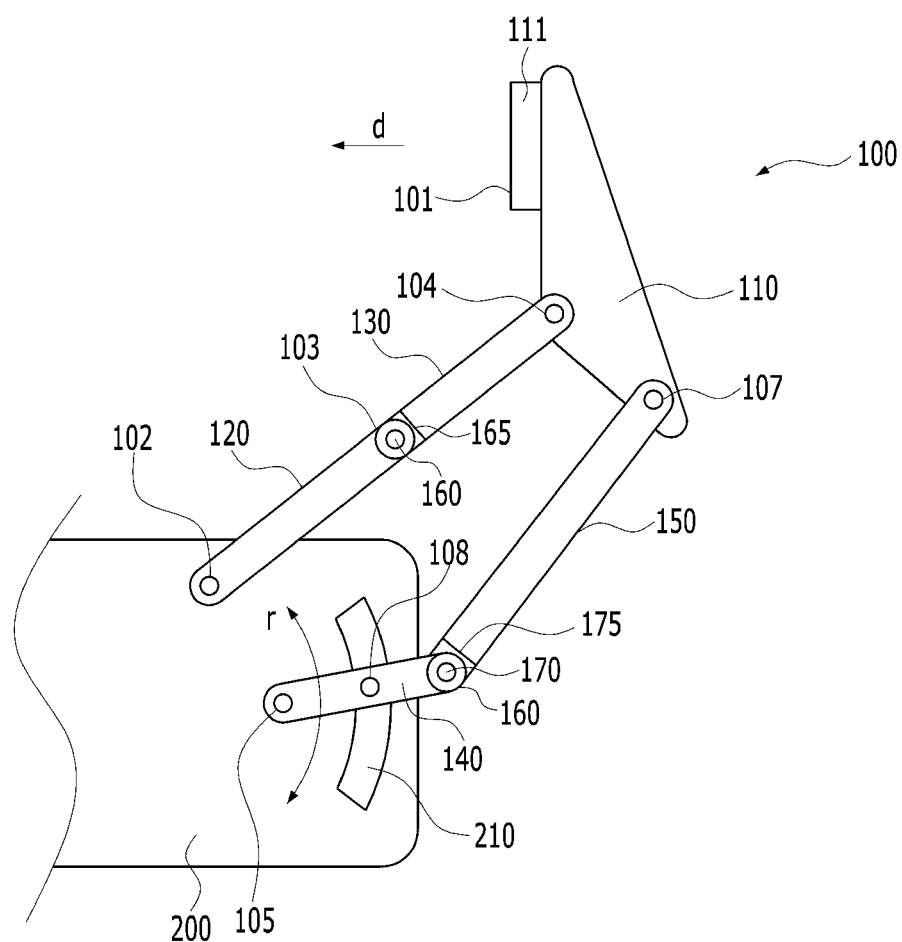

[FIG. 5]
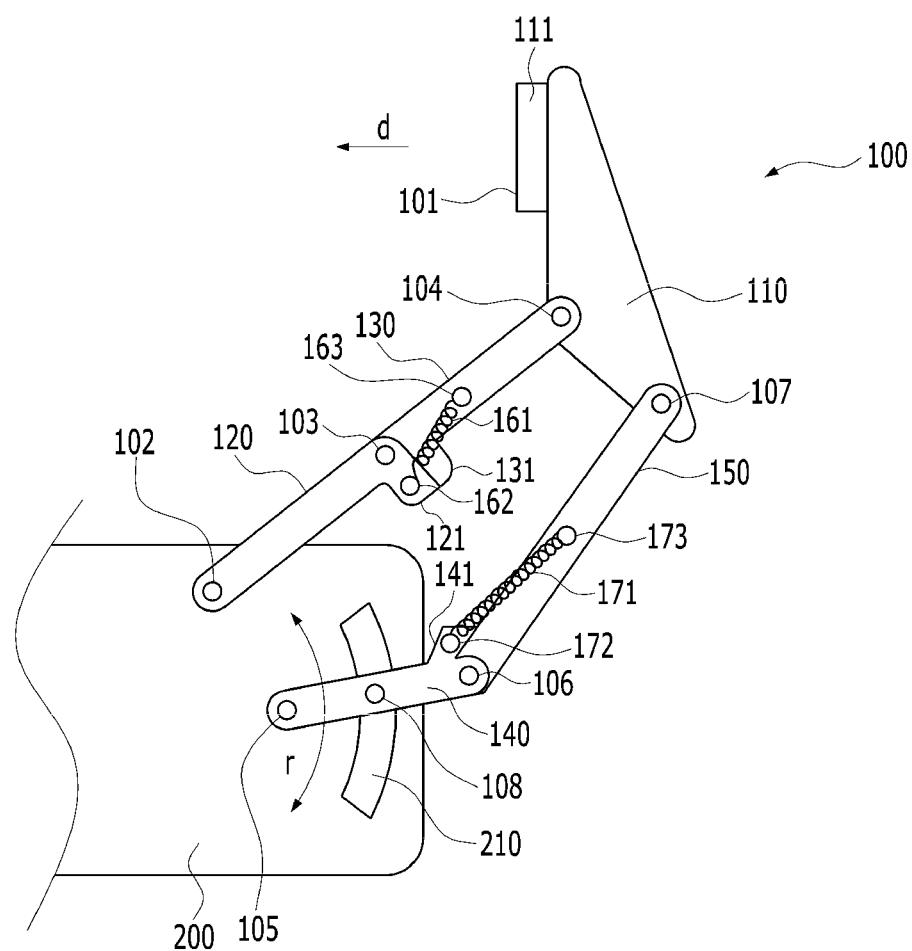

[FIG. 6]
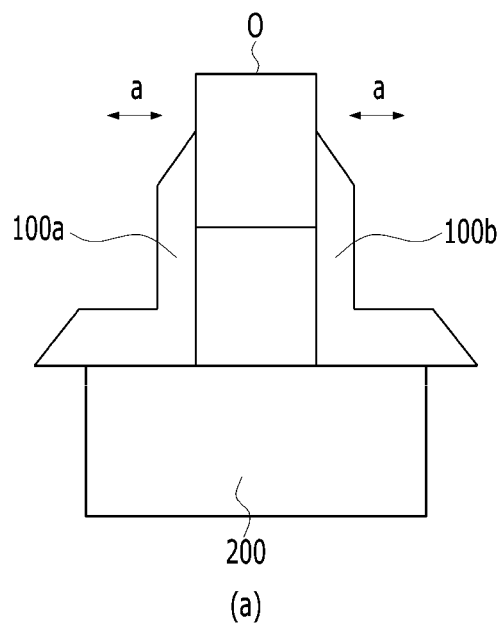
(a)
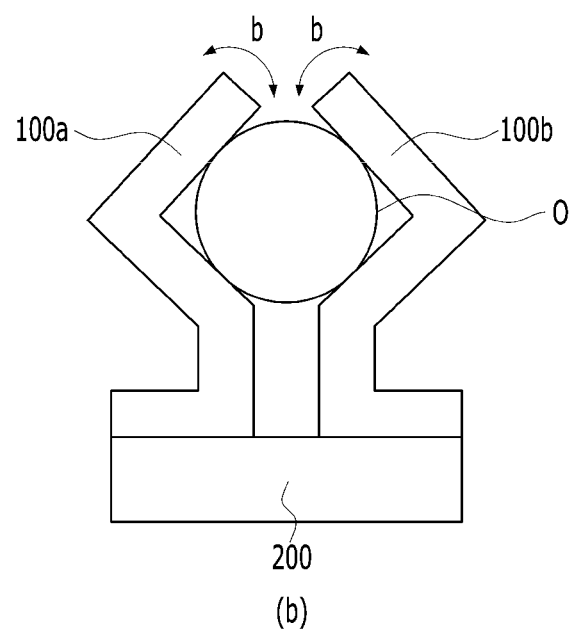
(b)

[FIG. 7]
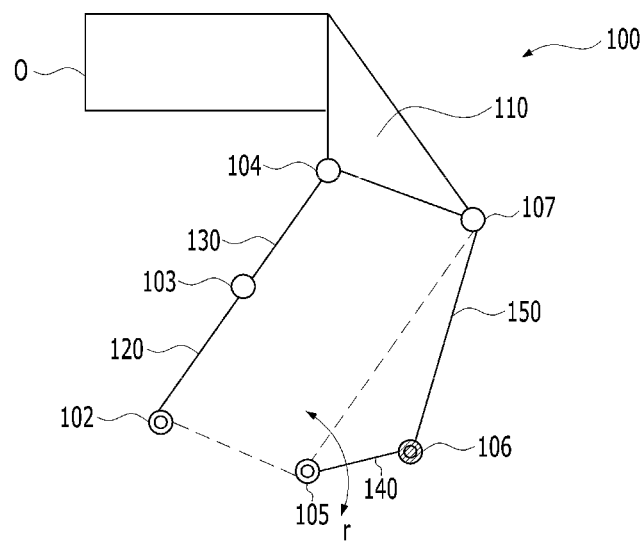
(a)
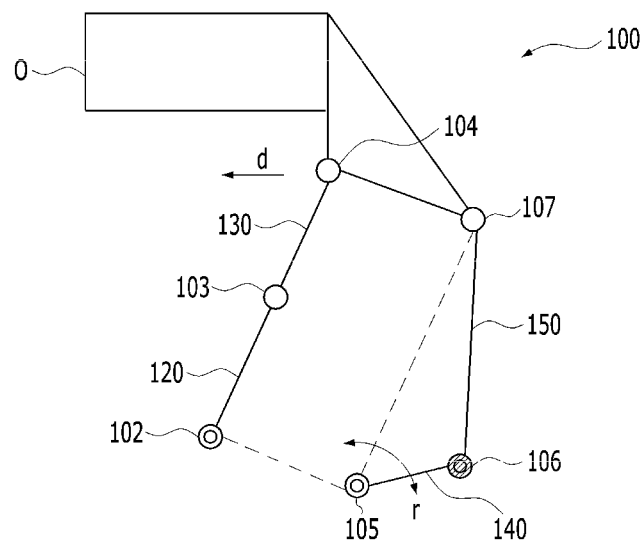
(b)

[FIG. 8]
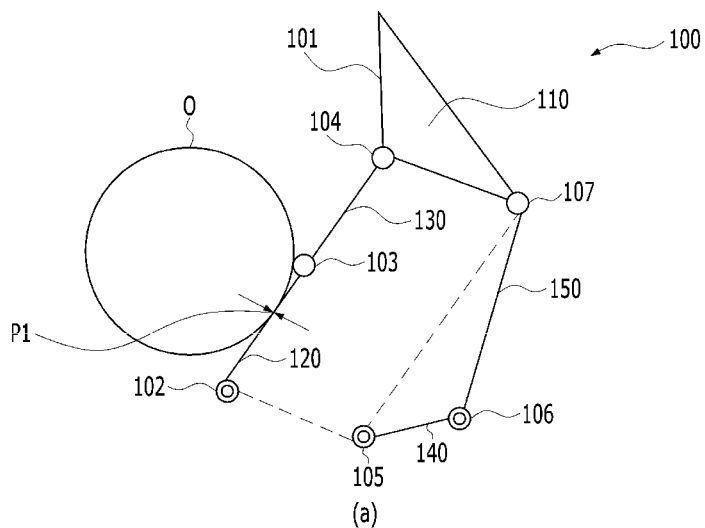
(a)
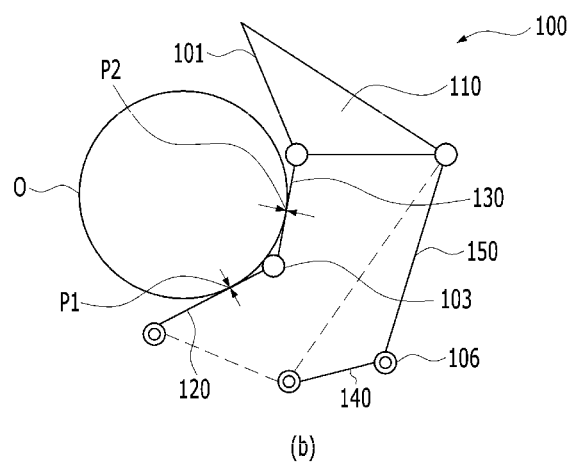
(b)
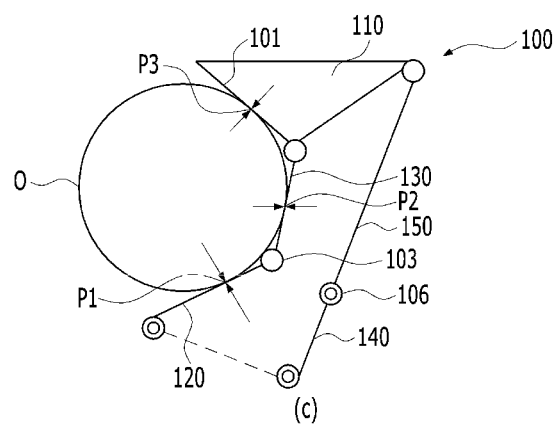
(c)

[FIG. 9]
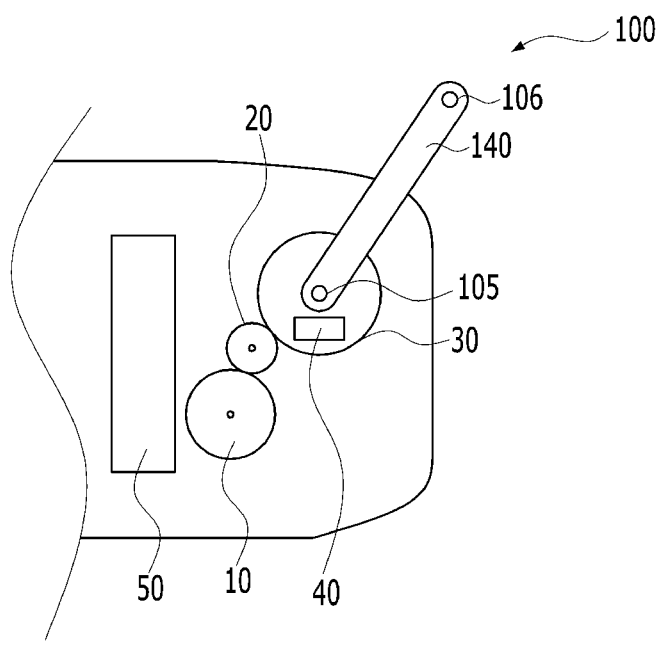

[FIG. 10]
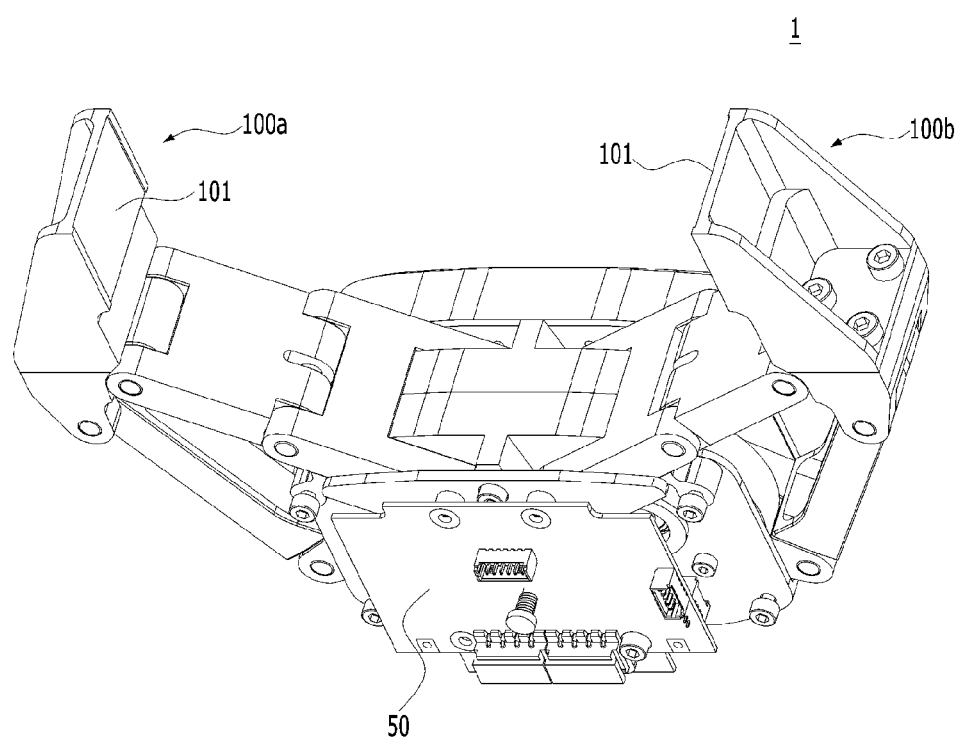

[FIG. 11]
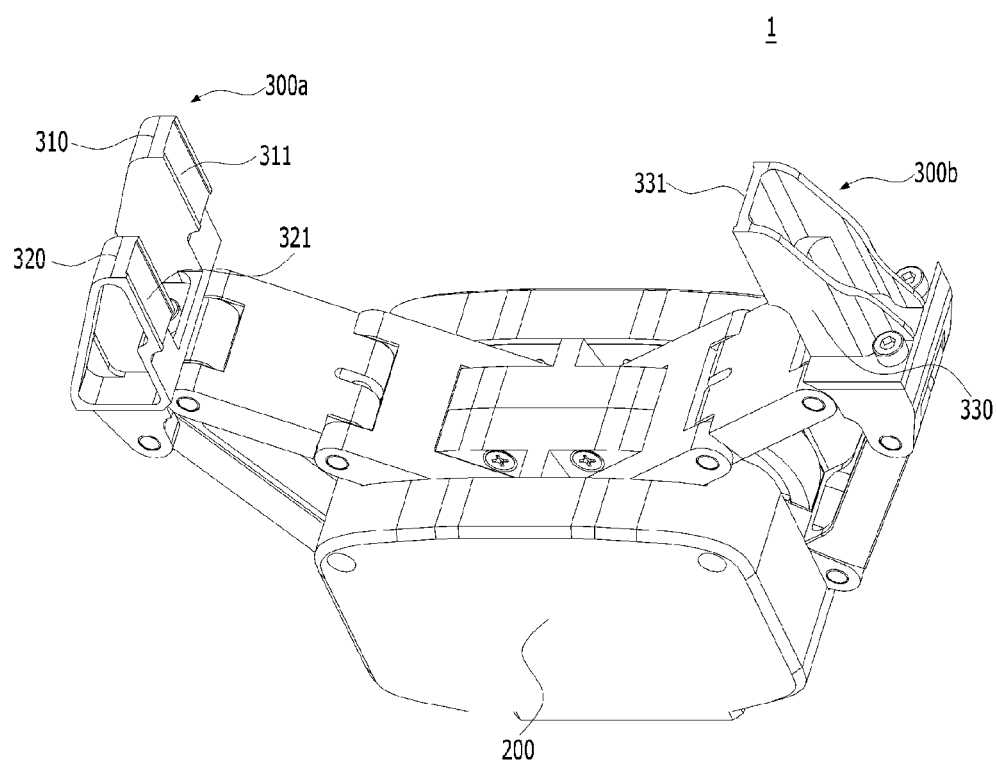

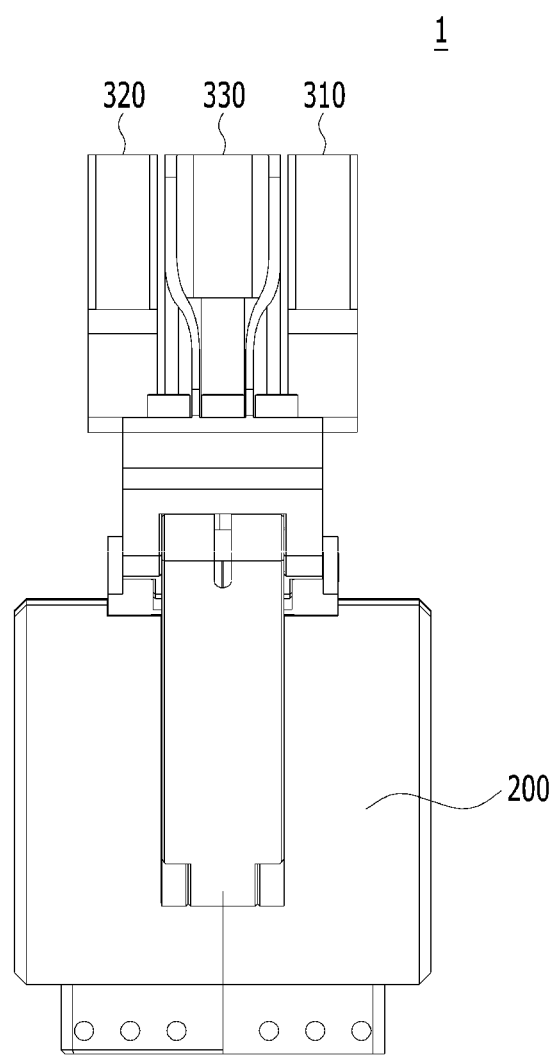
[FIG. 12]

9,782,902 B1

GRIPPER FOR ROBOT HAND CAPABEL OF ADAPTIVE GRASP

CROSS REFERENCE TO PRIOR APPLICATIONS

This application claims priority to and the benefit of Korean Patent Application No. 10-2016-0081884 filed in the Korean Intellectual Property Office on Jun. 29, 2016, the entire contents of which are incorporated herein by reference.

TECHNICAL FIELD

The present disclosure relates to a gripper for robot hand capable of adaptive grasp. More particularly, the present disclosure relates to a gripper for robot hand capable of adaptive grasp, which stably grasps objects having various shapes and sizes by using a plurality of links and elastic members.

DESCRIPTION OF THE RELATED ART

Recently the utilization of robots has increased in various fields.

In particular, multi-joint robot is used in various fields, such as industrial automation process, assembling and transferring components, sorting objects, medical equipment, remote control, or the likes. Also, humanoid multi-joint robot used for many purpose has been developed. The end of such robots, especially multi-joint robots, is called as robot hand. A gripper is mounted to the robot hand in order to grip or fix objects. The gripper consists of a pair of fingers, and the grip of the gripper may be roughly identified by pinch grip and encompassing grip depending on the operation method of the finger. The pinch grip is a method grasping objects by vertically approaching both end of fingers. The encompassing grip is a method grasping and encompassing objects by using a joint structure or a link structure.

However, the pinch grip may not stably grasp objects unless the object is a hexahedron or its size is constant.

In contrast, the encompassing grip may grasp various objects, but the sizes of objects are limited depending on the length of the joint (link). Particularly, in case of grasping cylindrical objects, grasping is difficult if the length of the joint is shorter than the limited size of the object. Even if grasping is possible, suitable gripping force may be hardly obtained.

To solve these problems, the length of link may be adjusted by the method of changing a finger of the gripper. In this case, the range of object's size may be broadened. However, this method causes decrease of the gripping stroke allowance of the gripper itself, and above all, it wastes processing costs and time.

RELATED ART DOCUMENT

Patent Document

Korean Patent Laid-Open Publication No. 10-2012-0033611 (2012.04.09.)

Korean Patent Laid-Open Publication No. 10-2015-0089657 (2015.08.05)

SUMMARY OF THE INVENTION

Problem to be Solved

The technical problem to be solved in the present disclosure provides a gripper for robot hand capable of adaptive grasp by solving the above-mentioned problem of the related art.

The technical problem to be solved in the present disclosure are not limited to the above-mentioned technical problem, and any other technical problems not mentioned will be clearly understood from the following description by those skilled in the art.

Means of Solving Problems

In order to achieve the above technical problem, an exemplary embodiment of the present disclosure provides a gripper for robot hand capable of adaptive grasp, including a finger unit having one or more finger. The finger includes a first link of which one end is rotatably fixed to a casing, a second link of which one end is jointly coupled with the other end of the first link, a third link of which one end is rotatably fixed to the casing, which is operated by receiving a driving force from the outside, a fourth link of which one end is jointly coupled with the other end of the third link, and a gripping member jointly coupled with the other end of the second link and the other end of the fourth link. The pinch grip and the encompassing grip are selectively or sequentially performed by the limitation of the driving of two members among the first link, the second link, the third link, the fourth link, and the gripping member.

According to an exemplary embodiment of the present disclosure, a first elastic member provided between the first link and the second link or between the second link and the gripping member may be biased in the direction of gripping. In addition, a second elastic member provided between the third link and the fourth link or between the fourth link and the gripping member may be biased in the opposite direction of gripping.

In an exemplary embodiment of the present disclosure, the finger unit may consist of a pair of fingers facing each other.

In an exemplary embodiment of the present disclosure, the pair of fingers may have contact surfaces in contact with objects. The contact surfaces provided in each finger may be capable of contacting each other.

According to an exemplary embodiment of the present disclosure, the pair of fingers may have branches facing each other, and the branches of each finger may have contact surfaces in contact with objects. The contact surfaces of each branch may be crossed but may not be mutually contacted.

In an exemplary embodiment of the present disclosure, the first elastic member and the second elastic member may be torsion springs or coil springs.

In an exemplary embodiment of the present disclosure, the third link may be integrally or separately mounted to a driven gear receiving a driving force by a motor and a reduction unit.

According to an exemplary embodiment of the present disclosure, a position encoder capable of sensing the absolute position value may be mounted to the driven gear.

In an exemplary embodiment of the present disclosure, a control unit controlling the driving of the third link may be provided into the casing.

Effects of the Invention

According to an exemplary embodiment of the present disclosure, a gripper for robot hand, which stably grasps objects having various shapes and sizes by using a plurality of links and elastic members may be provided.

In addition, without decrease of the gripping stroke allowance, a gripper may grip various objects with a high gripping force by selectively or sequentially performing pinch grip or encompassing grip. The effect of the present disclosure is not limited to the above-mentioned effects, and it should be understood to include all possible effects deduced from the configuration of the disclosure described in the detailed description or the claims of the present disclosure.

BRIEF DESCRIPTION OF THE DRAWINGS

FIGS. 1 and 2 are perspective views of a gripper for robot hand according to an exemplary embodiment of the present disclosure.

FIG. 3 is a front view of a gripper according to FIG. 1.

FIG. 4 is a detailed block diagram of a gripper for robot hand according to an exemplary embodiment of the present disclosure.

FIG. 5 is a detailed block diagram of a gripper for robot hand according to another exemplary embodiment of the present disclosure.

FIG. 6 is a conceptual diagram of pinch grip and encompassing grip by a gripper.

FIG. 7 is an operation of a gripper for robot hand according to an exemplary embodiment of the present disclosure.

FIG. 8 is an operation of adaptive grasp of a gripper for robot hand according to an exemplary embodiment of the present disclosure.

FIG. 9 is a block diagram illustrating a driving module of a gripper for robot hand according to an exemplary embodiment of the present disclosure.

FIG. 10 is a drawing illustrating a control unit mounted to a gripper for robot hand according to an exemplary embodiment of the present disclosure.

FIG. 11 is a perspective view illustrating a gripping unit of a gripper for robot hand according to another exemplary embodiment of the present disclosure.

FIG. 12 is a side view of a gripper according to FIG. 11.

DETAILED DESCRIPTION OF THE EMBODIMENTS

The present disclosure will be described hereinafter with reference to the accompanying drawings.

However, the present disclosure may be modified in various different ways, and the present disclosure is not limited to the described exemplary embodiments.

Moreover, the part not related to the description will be omitted in order to clearly describe the present disclosure. Like reference numerals designate like elements throughout the specification.

In the specification, when a part is connected (accessed, contacted, or coupled) with other parts, it includes "direct connection" as well as "indirect connection" in which the other member is positioned between the parts.

In addition, unless explicitly described to the contrary, the word "comprise", such as "comprises" or "comprising" will be understood to imply the inclusion of stated elements but not the exclusion of any other elements.

The terms used in this specification are merely used to describe particular embodiments, and are not intended to limit the present disclosure.

Expression in the singular number include a plural forms unless the context clearly indicates otherwise.

In this specification, the term "comprise" or "have" is intended to designate characteristic, numbers, steps, operations, elements, components, or combinations thereof, but it is not intended to preclude the presence or addition of one or more other features, numbers, steps, operations, elements, components, or combinations.

Hereinafter, exemplary embodiments of the present disclosure will be described in detail with reference to the accompanying drawings.

FIGS. 1 and 2 are perspective views of a gripper for robot hand according to an exemplary embodiment of the present disclosure. FIG. 3 is a front view of a gripper according to FIG. 1.

As described, the gripper (1) for robot hand according to the present disclosure comprises the pair of fingers (100a, 100b) mounted to the casing (200).

A motor, a reduction unit, or a control unit may be provided in the casing (200), and a cable electrically connected to a motor, a reduction unit, or a control unit may be provided.

The gripper (1) is provided to the end of robot hand in order to grip (grasp) objects. Generally, the gripper (1) installed to multi-joint robots is used for various operations, such as transfer, classification, or assembly of objects/components.

Since the structure of robot, robot hand, or multi-joint robot are well known in the art, the detailed description thereof will be omitted.

The gripper (1) may grasp "objects" including objects, components, assemblies, tools, or the likes.

Referring to FIG. 3, the pair of fingers (100a, 100b) has each contact surface (101), and objects may be grasped between the contact surfaces (101).

The contact surface (101) horizontally facing each other in the normal state, namely in the waiting state before gripping objects.

In the pinch grip, objects may be grasped only at the between the contact surfaces (101). In contrast, in the encompassing grip, objects may be grasped at the link as well as the contact surface (101). Details of this will be described later.

According to the drawing, the pair of fingers (100a, 100b) is facing each other. The finger unit consists of the pair of fingers (100a, 100b).

That is, the finger unit may include the pair of fingers (100a, 100b).

However, one or more fingers are enough to be the finger unit. For example, a form in which a finger capable of driving and a fixed member facing the finger may be available. In addition, a form in which three or more fingers capable of driving, which are spaced apart from each other based on the center line also may be available.

Therefore, the description of symbol "100" is used to illustrate a certain finger because various type of finger units may be available.

Moreover, each finger may be independently rotatable. In this case, the gripper may stably grasp objects having an asymmetric structure.

Moreover, by using the finger structure independently rotatable, the gripper may be transformed to different type of gripping modes depending on use environment or user's choice.

Hereinafter, with reference to the drawings, the configuration and operation of the finger according to an exemplary embodiment of the present disclosure will be described.

FIG. 4 is a detailed block diagram of a gripper for robot hand according to an exemplary embodiment of the present disclosure. FIG. 5 is a detailed block diagram of a gripper for robot hand according to another exemplary embodiment of the present disclosure.

Referring to FIG. 4, as described, the finger (100) comprises the first link (120), the second link (130), the third link (140), the fourth link (150), and the gripping member (110), which are connected to each other.

That is, the finger of the gripper according to the present disclosure has a link structure (linkage).

In the first link (120), one end is rotatably fixed to the casing (200), and the other end is jointly coupled with the second link (130).

"Rotatably fixed" means that even though the position is fixed, the rotation may be available. "Jointly coupled" means that the position is not fixed, and it is rotatably coupled through a pin or shaft or the like.

In the second link (130), one end is jointly coupled with the other end of the first link (120), and the other end is jointly coupled with the gripping member (110).

In the third link (140), one end is rotatably fixed to the casing (200), and the other end is jointly coupled with the fourth link (150).

In the fourth link (150), one end is jointly coupled with the other end of the third link (140), and the other end is jointly coupled with the gripping member (110).

In the gripping member (110), the contact unit (111) may be integrally or separately provided on the area facing with objects.

In the contact unit (111), all or part of the contact surface (101) facing with objects may be made of grip-enhancing materials.

The gripping member (110), the first link (120), the second link (130), the third link (140), the fourth link (150), and the casing (200) have a six-bar link structure.

The first link (120) and the coupling unit of the casing (200) is connected by the first joint (102).

The first joint (102) may be a separate element like a pin or shaft, or it also may be an integrated element with a link, such as a convex/concave coupling unit provided in the link. This also applies to other joints.

The first link (120) and the coupling unit of the second link (130) is connected by the second joint (103). The third link (140) and the coupling unit of the casing is connected by the third joint (105). The third link (140) and the coupling unit of the fourth link (150) is connected by the fourth joint (106).

In addition, the second link (130) and the coupling unit of the gripping member (110) is connected by the first end of joint (104). The fourth link (150) and the coupling unit of the gripping member (110) is connected by the second end of joint (107).

The pin member (108) may be provided in the middle of the third link (140).

Since the pin member (108) moves along the guide groove (210) provided in the casing (200), the range of rotation of the pin member (108) may be properly restricted.

Moreover, a rotation of the third link may be controlled up to the gripping stroke allowance depending on the location and length of each link.

The third link (140) is only a driving link, and other links are driven links.

The third link (140) may receive a driving force by a driving device such as a motor, actuator, or the likes. The detail will be described later.

As described, the third link (140) may be rotatable along the driving direction (r) within a certain range.

The gripping member (110), each link (120, 130, 140, and 150), and the casing (200) have a six-bar link structure. In addition, the location of the first joint (102) and the third joint (105) is fixed. Accordingly, there are three degrees of freedom.

Therefore, to control two idle degrees of freedom, the driving of two members among the first link (120), the second link (130), the third link (140), the fourth link (150), and the gripping member (110) is restricted.

To restrict the driving of the member (or the link), an elastic member may be provided between each adjacent member. Accordingly, the member (or the link) may be biased in the direction of one side.

For example, to control a mutual moving of each adjacent member (link), an elastic member may be provided in two certain areas among between the casing (200) and the first link (120), between the first link (120) and the second link (130), between the second link (130) and the gripping member (110), between the third link (140) and the fourth link (150), and between the fourth link (150) and the gripping member (110).

Accordingly, the pinch grip and encompassing grip of the finger may be selectively or sequentially performed.

Hereinafter, an exemplary embodiment of the present disclosure describes controlling a mutual moving of the first link (120) and the second link (130), and a mutual moving of the third link (140) and the fourth link (150) by the elastic member.

Referring to FIG. 4, the first torsion spring (160) is provided at the position of the second joint (103) located between the first link (120) and the second link (130).

The first torsion spring (160) is positioned to bias the first link (120) and the second link (130) in the direction of the object, namely in the direction of gripping (d).

The first stopper (165) is provided in one or both of the first link (120) and the second link (130) not to bias the first link (120) and the second link (130) more than a predetermined angle.

According to FIG. 4, the first torsion spring (160) elastically supports the first link (120) and the second link (130), and the first stopper (165) maintains the first link (120) and the second link (130) at about 180 degree angle. Such holding angle may not be determined at any one of a number.

In the above, the configuration in which the first torsion spring (160) is provided in the second joint (103) positioned between the first link (120) and the second link (130) is described. However, the configuration in which the first torsion spring (160) is provided in the first end of joint (104) positioned between the second link (130) and the gripping member (110) is also available to control a mutual moving of the second link (130) and the gripping member (110) by an elastic force.

Accordingly, a mounting position or a shape of the first stopper (165) may be changeable.

Next, a second torsion spring (170) is provided in the fourth joint (106) positioned between the third link (140) and the fourth link (150).

The second torsion spring (170) is positioned to bias the third link (140) and the fourth link (150) in the opposite direction of gripping (d).

The second stopper (175) is provided in one or both of the third link (140) and the fourth link (150) not to bias the third link (140) and the fourth link (150) more than a predetermined angle.

According to FIG. 4, the second torsion spring (170) elastically supports the third link (140) and the fourth link (150), and the second stopper (175) maintains the third link (140) and the fourth link (150) at about 135 degree angle. Such holding angle may not be determined at any one of a number.

In the above, the configuration in which the second torsion spring (170) is provided in the fourth joint (106) positioned between the third link (140) and the fourth link (150) is described. However, the configuration in which the second torsion spring (170) is provided in the second end of joint (107) positioned between the fourth link (150) and the gripping member (110) is also available to control a mutual moving of the fourth link (150) and the gripping member (110) by an elastic force.

Accordingly, a mounting position or a shape of the second stopper (175) may be changeable.

In the above-described exemplary embodiments, a torsion spring is used for the elastic bias between links, however, the present disclosure is not limited to such configuration.

For example, referring to FIG. 5, the first coil spring (161) may be provided between the first link (120) and the second link (130).

The one end (162) of the first coil spring (161) is fixed to the first link (120), and the other end (163) is fixed to the second link (130). Accordingly, the first link (120) and the second link (130) may be biased in the direction of gripping (d).

In addition, the first protrusion (121) protruded to the outside of the direction of gripping (d) is provided in the end portion of the other end of the first link (120), and the second protrusion (131) protruded to the outside of the direction of gripping (d) is provided in the end portion of the one end of the second link (130).

Such the first protrusion (121) and the second protrusion (131) prevent the movement of the first link (120) and the second link (130) more than a predetermined angle. Accordingly, the combination of the first protrusion (121) and the second protrusion (131) may be regarded as the first stopper (165).

Referring to FIG. 5, the second coil spring (171) may be provided between the third link (140) and the fourth link (150).

The one end (172) of the second coil spring (171) is fixed to the third link (140), and the other end (173) is fixed to the fourth link (150). Accordingly, the third link (140) and the fourth link (150) may be biased in the opposite direction of gripping (d).

Similar to that described above, the second coil spring (171) also may be provided between the fourth link (150) and the gripping member (110), and not between the third link (140) and the fourth link (150).

In addition, the third protrusion (141) protruded to the inside of the direction of gripping (d) is provided in the end portion of the other end of the third link (140).

The third link (140) and the fourth link (150) is prevented from moving more than a predetermined angle by the third protrusion (141) and the fourth link (150). Accordingly, the third protrusion (141) may be regarded as the second stopper (175).

The above-described exemplary embodiment describes that a protrusion, as an example of a stopper, which is provided one or both sides of the link coupled to each other controls the rotating angle. Other configurations having such a function may also be used.

Moreover, the above exemplary embodiment describes that a torsion spring or a coil spring may be used for elastic bias between links. The first torsion spring (160) and the first coil spring (161) are referred to as "the first elastic member."

In addition, the second torsion spring (170) and the second coil spring (171) are referred to as "the second elastic member."

Different shape of springs or elastic members may be used as the first and second elastic member, or different springs may be simultaneously used as the first and second elastic member.

Next, the operation of the gripper for robot hand according to the present disclosure will be described.

FIG. 6 is a conceptual diagram of pinch grip and encompassing grip by a gripper. FIG. 7 is an operation of a gripper for robot hand according to an exemplary embodiment of the present disclosure. FIG. 8 is an operation of adaptive grasp of a gripper for robot hand according to an exemplary embodiment of the present disclosure.

FIG. 6 (*a*) describes the motion of pinch grip. The pair of fingers (100*a*, 100*b*) translationally moves against the casing (200) in a direction opposite to each other ("a" direction). Accordingly, the object (O) is grasped.

The motion of pinch grip is simply and easily performed, however, it is difficult to stably grip objects. In addition, there are constraints on sizes or shapes of gripping objects.

Next, FIG. 6 (*b*) describes the motion of encompassing grip.

The pair of fingers (100*a*, 100*b*) moves against the casing (200) in a rotating direction ("b" direction). According to that, the object (O) is gripped.

The motion of encompassing grip may grasp objects having various shapes, however, there are constraints on gripping stroke allowance and sizes of gripping objects depending on the length of the link.

Thus, the gripper for robot hand according to the present disclosure may stably grip objects having various shapes and sizes with a high gripping force by performing selectively or sequentially pinch grip or encompassing grip.

FIGS. 7 and 8 are drawings illustrating an operation of the link structure of the gripper for robot hand according to an exemplary embodiment of the present disclosure by simplifying the link structure.

FIG. 7 describes that the motion of pinch grip performed by the first link (120), the second link (130), the third link (140), the fourth link (150), and the gripping member (110), which configure the link structure of the finger (100).

Showing the elastic member is omitted. The mutual moving of the first link (120) and the second link (130) and the mutual moving of the third link (140) and the fourth link (150) are controlled by the first and second elastic members.

The first joint (102) and the third joint (105) are rotatably fixed to the unillustrated casing. Other joints (103, 104, 106, and 107) are jointly coupled.

The internal shape (indicated by a dotted line in the figure) consisting of the first joint (102), the first end of joint (104), the third joint (105), the second end of joint (107) configures a parallelogram structure, and the motion of pinch grip is performed by the parallelogram structure.

In other words, in FIG. 7 (*a*), the gripping member (110) moves toward the direction of gripping (b) because the third link (140) of the finger (100) is rotated along the driving direction (r). This is the state of FIG. 7 (b). In case of FIGS. 7 (a) and (b), the angle in which the gripping member (110) faces with the object (O) is constantly maintained because the internal shape configures a parallelogram structure. Such the motion of pinch grip has an advantage when the object (O) has a polyhedron shape such as a hexahedron.

Next, the motion of grasping the cylindrical object (O) will be described by referring to FIG. 8. As described in FIG. 8 (a), the cylindrical object (O) is contacted with the first link (120) of the finger (100) at the first contact point (P1).

Next, as described in FIG. 8 (b), the third link (140) is continuously rotated toward the object. After that, the object (O) is also contacted with the second link (130) at the second contact point (P2).

Next, as described in FIG. 8 (c), if the third link (140) is rotated more toward the object, the object (O) is contacted with the third contact point (P3) of the contact surface (101) of the gripping member (110).

In the above, the contact with the object (O) occurs in the following order: the first contact point (P1), the second contact point (P2), and the third contact point (P3). However, the contact order may be changeable depending on the size or initial location of the object (O).

For example, the contact with the object (O) may occur in the following order: the second contact point (P2), the first contact point (P1), and the third contact point (P3). In addition, the contact with the object (O) may occur in the following order: the second contact point (P2), the third contact point (P3), and the first contact point (P1).

The sequential contact with the object (O) also may occur in a different order.

Moreover, the simultaneous contact as well as the sequential contact also may be available. For example, the first contact point (P1) and the second contact point (P2) may be simultaneously contacted.

As described above, a gripper for robot hand according to an exemplary embodiment of the present disclosure has a six-bar link structure. Accordingly, encompassing grip may be performed. In particular, a finger (100) may grasp the cylindrical object (O) at three or more contact points by the elastic member.

Thus, the gripper may stably grasp the object (O) with high gripping force.

Particularly, the gripper may stably small and complicated object without change of the link itself because the first link (120) and the second link (130) are segmented. Therefore, a relatively higher gripping stroke allowance may be available.

As a result, the gripper may stably and easily grasp large or small objects.

As described above, a gripper for robot hand according to the present disclosure may selectively or sequentially perform the pinch grip and encompassing grip. Thus, it named as "adaptive grasp" meaning that multifunctional grasp may be performed.

Next, the driving process of the third link will be described.

FIG. 9 is a block diagram illustrating a driving module of a gripper for robot hand according to an exemplary embodiment of the present disclosure. FIG. 10 is a drawing illustrating a control unit mounted to a gripper for robot hand according to an exemplary embodiment of the present disclosure.

As described at FIG. 9, the motor (10) as a driving source, the reduction unit (20), and the driven gear (30) are provided inside the casing.

The reduction unit (20) conveys a driving force from the motor (10) to the driven gear (30). To reduce speed and increase torque, the reduction unit (20) may be embodied by the connection of two or more stage of gear unit.

The third link (140) is integrally or separately fixed into a driven gear (30). The rotation of the third link (140) is performed depending on the rotation of the driven gear (30), and it causes the motion of gripping by the gripper.

Integral fixation of the driven gear (30) and the third link (140) means that the driven gear (30) and the third link (140) could be made as one element.

In the above-described exemplary embodiments, a worm gear, a rack-pinion, a planetary gear, as well as a typical cylindrical gear may be used as the reduction unit (20).

In the meantime, the position encoder (40) may be provided in the driven gear (30).

The position encoder (40) may sense an absolute position value of the rotation angle of a driven gear (30) and feedback the sensed absolute position value. Accordingly, the position feedback of the link may be available.

Also, the control unit (50) may be provided inside the casing.

Referring to FIG. 9 and FIG. 10, the control unit (50) controlling the driving of the third link (140) may be prepared as a control board shape. Such the control unit (50) is provided inside the casing. Accordingly, the gripper (1) performs as an integrated gripper capable of independently driving.

The control unit (50) may have an interface to communicatively connect to the outside with a wireless or wired connection.

In the above-described embodiment, the finger unit (100) consists of a pair of fingers (100a, 100b) facing each other (referring to FIG. 1 and FIG. 4).

In this point, a pair of fingers (100a, 100b) has contact surfaces (101) contacting with objects.

The contact surfaces (101) provided in each finger (100a, 100b) is capable of contacting each other, and it is understood that the contact surfaces (101) of each finger (100a, 100b) may be actually contactable if there is no objects.

However, the configuration of the finger unit (100) is not limited to the above-described exemplary embodiments. Thus, it will be described with reference to the accompanying drawings.

FIG. 11 is a perspective view illustrating a gripping unit of a gripper for robot hand according to another exemplary embodiment of the present disclosure, and FIG. 12 is a side view of a gripper according to FIG. 11.

The gripper (1) according to the exemplary embodiment has a pair of fingers (300a, 300b) connecting to the casing (200).

The pair of fingers (300a, 300b) has branches (310, 320, and 330) facing each other, and the branches (310, 320, and 330) of each finger has contact surfaces (311, 321, and 331) contacting with objects.

The contact surfaces (311, 321, and 331) of each branch (310, 320, and 330) are crossed but not mutually contacted. In other words, in the exemplary embodiment, one or two or more branch (310, 320, and 330) configures one gripping member. In addition, the gripping member or branch has various shapes and pieces, and it may be provided as exchangeable optional device.

Thus, the gripping member or branch may be suitably used, replaced, or changed depending on shapes or sizes of objects, use of robot hand, or the likes.

Referring to FIG. 11, any one of finger (300a) positioned at the left side in the drawing has structure of the gripping member consisting of two branches (310, 320).

In contrast, another finger (300b) positioned at the right side in the drawing has structure of the gripping member consisting of one branch (330).

These branches (310, 320, and 330) have each contact surface (311, 321, and 331) contacting with objects. As illustrated in FIG. 12, the contact surfaces (311, 321) positioned at the branches (310, 320) of the left finger (300a) and the contact surface (331) positioned at the branch (330) of the right finger (300b) are crossed but not mutually contacted when there is no object.

By having such a structure, the present disclosure may perform encompassing grip against small objects.

As described above, in the gripper for robot hand according to the present disclosure, the motion of pinch grip and encompassing grip are selectively or sequentially performed against objects having various shapes and sizes by using the six-bar link structure and the elastic member. In other words, the adaptive grasp is available.

Further, by using the adaptive grasp, the gripping force increases and gripping stroke allowance becomes larger.

The above-described description of the present disclosure are for illustrative purposes. It would be apparent to one skilled in the art may understand that it is possible to easily modified in other specific forms without departing from the technical spirit and essential features of the present disclosure. Thus, above-described embodiments should be understood that they have been presented by way of example, and not limitation.

For example, each component described as one-piece embodiment may be distributed. The component described as the degree of dispersion may be carried out in a combined form.

The scope of the present disclosure is represented by the following claims, and it should be construed that all changes or variations derived from the meaning and scope of the claims and the equivalent concept thereof are included within the scope of the present disclosure.

[DESCRIPTION OF SYMBOLS]

| | |
|---|---|
| 1: gripper for robot hand | 10: motor |
| 20: reduction unit | 30: driven gear |
| 40: position encoder | 50: control unit |
| 100: finger unit | 100a, 100b: finger |
| 110: gripping member | 111: contact unit |
| 101: contact surface | 120: first link |
| 130: second link | 140: third link |
| 150: fourth link | 102: first joint |
| 103: second joint | 104: first end of joint |
| 105: third joint | 106: fourth joint |
| 107: second end of joint | 108: pin member |
| 160: first torsion spring | 165: first stopper |
| 170: second torsion spring | 175: second stopper |
| 161: first coil spring | 171: second coil spring |
| 200: casing | 210: guide groove |
| 300a, 300b: finger | |

What is claimed is:

1. A gripper for robot hand capable of adaptive grasp, comprising,
    a finger unit having one or more finger;
    wherein the finger includes:
    a first link of which one end is rotatably fixed to a casing;
    a second link of which one end is jointly coupled with the other end of the first link;
    a third link of which one end is rotatably fixed to the casing, which is operated by receiving a driving force from the outside;
    a fourth link of which one end is jointly coupled with the other end of the third link; and
    a gripping member jointly coupled with the other end of the second link and the other end of the fourth link; and
    wherein a pinch grip and an encompassing grip are selectively or sequentially performed by the limitation of the driving of two members among the first link, the second link, the third link, the fourth link, and the gripping member, and
    wherein a first elastic member provided between the first link and the second link or between the second link and the gripping member is biased in the direction of gripping, and a second elastic member provided between the third link and the fourth link or between the fourth link and the gripping member is biased in the opposite direction of gripping.

2. The gripper for robot hand capable of adaptive grasp of claim 1,
    wherein the finger unit consists of a pair of fingers facing each other.

3. The gripper for robot hand capable of adaptive grasp of claim 2,
    wherein the pair of fingers has contact surfaces being capable of contacting each other.

4. The gripper for robot hand capable of adaptive grasp of claim 2,
    wherein the pair of fingers has branches facing each other.

5. The gripper for robot hand capable of adaptive grasp of claim 1,
    wherein the first elastic member and the second elastic member are torsion springs or coil springs.

6. The gripper for robot hand capable of adaptive grasp of claim 1,
    wherein the third link is integrally or separately mounted to a driven gear receiving a driving force by a motor and a reduction unit.

7. The gripper for robot hand capable of adaptive grasp of claim 6,
    wherein a position encoder capable of sensing the absolute position value is mounted to the driven gear.

8. The gripper for robot hand capable of adaptive grasp of claim 1,
    wherein a control unit controlling the driving of the third link is provided in the casing.

* * * * *